(12) United States Patent
Peter

(10) Patent No.: US 6,967,302 B2
(45) Date of Patent: Nov. 22, 2005

(54) FREEWHEEL COUPLING DEVICE FOR A SPRING-LOADED OPERATING MECHANISM FOR A HIGH-VOLTAGE CIRCUIT-BREAKER

(75) Inventor: Von Allmen Peter, Buchs AG (CH)

(73) Assignee: Alstom T & D S.A., Paris (FR)

( * ) Notice: Subject to any disclaimer, the term of this patent is extended or adjusted under 35 U.S.C. 154(b) by 19 days.

(21) Appl. No.: 10/680,199

(22) Filed: Oct. 8, 2003

(65) Prior Publication Data

US 2004/0104106 A1 Jun. 3, 2004

(30) Foreign Application Priority Data

Oct. 9, 2002 (FR) .............................................. 02 12540

(51) Int. Cl.[7] .......................... F16D 11/00; H01H 3/00; H01H 5/00
(52) U.S. Cl. ...................... 218/154; 200/400; 192/66.1
(58) Field of Search ............................... 192/66.1, 66.2, 192/66.21–66.23, 69, 70.11, 70.13, 70.15, 70.22, 89.2; 200/400, 401, 500, 501

(56) References Cited

U.S. PATENT DOCUMENTS 4,762,971 A 8/1988 Yabe 6,041,902 A * 3/2000 Wiley ...................... 192/66.22

FOREIGN PATENT DOCUMENTS

| FR | 657 552 A | 3/1929 |
| FR | 1 434 962 A | 4/1966 |

* cited by examiner

*Primary Examiner*—James R. Scott
(74) *Attorney, Agent, or Firm*—Sughrue Mion, PLLC

(57) ABSTRACT

A spring-loaded operating mechanism for a high-voltage circuit-breaker comprises, between a motor and a trigger shaft, a freewheel-type coupling device which comprises first and second friction members (5, 6) coaxially mounted on a secondary shaft (1). The first friction member (5) is screwed onto the secondary shaft (1) and the second friction member can freewheel about the secondary shaft (1) while being disposed between the first member and an axial abutment (8). The two members (5, 6) are substantially in abutment one against the other along the secondary shaft (1), and the first member is screwed or is unscrewed along the secondary shaft depending on whether it is rotated by the shaft or by the second member. The device does not require any greasing; it operates without maintenance. In addition, the forces exerted by one friction member on the other are low, thereby improving the reliability of the operating mechanism.

9 Claims, 2 Drawing Sheets

FREEWHEEL COUPLING DEVICE FOR A SPRING-LOADED OPERATING MECHANISM FOR A HIGH-VOLTAGE CIRCUIT-BREAKER

BACKGROUND OF THE INVENTION

The invention relates to an operating mechanism for a high-voltage circuit-breaker having a coupling device of the freewheel type between an electric motor and the trigger shaft of the operating mechanism, said coupling device comprising first and second friction members coaxially mounted along a secondary shaft, said secondary shaft being rotatably mounted to rotate in a predetermined direction when a spring-loaded mechanism that acts on the device relaxes, it being possible for the second friction member to freewheel about said secondary shaft in said predetermined direction at a speed of rotation that is lower than the speed of rotation of the secondary shaft, it also being possible for said second friction member to be rotated by the motor in said predetermined direction, and to become constrained to rotate with the first friction member so as to recock said spring-loaded mechanism.

In such an operating mechanism, the trigger shaft is moved by the spring which is a closure spring, and it moves the shaft which is a main shaft via a cam. In this way, the circuit-breaker is closed at the same time as an opening spring is tensioned.

In operation, the spring-loaded system is recocked after the spring has relaxed, by the motor rotating, the trigger shaft turning in the same predetermined direction of rotation when it is driven by the motor and when it is driven by the spring-loaded mechanism. The freewheel-type coupling device is designed such that the spring-loaded mechanism relaxing and thereby rotating the trigger shaft does not rotate the motor, which would slow down the speed of the trigger shaft, and thereby reduce the effectiveness of the operating mechanism.

In known operating mechanisms, the coupling device is generally implemented with a conventional freewheel, such as, for example, in U.S. Pat. No. 4,762,971. In that patent, the two friction members are formed by two coaxial rings between which balls are disposed. More particularly, the first friction member is a small-diameter ring which is mounted in fixed manner on the shaft, and the second friction member is a larger-diameter ring surrounding the first ring, as in the general configuration of a conventional ball bearing. Each ball is oval in shape and is held in a certain angular position by a spring so as to be continuously in abutment against both friction members. Depending on the direction of relative rotation of the friction members formed by the rings, the balls tend to be braced between the two rings to couple the device, or else to allow the rings to slide to decouple the device.

With that construction, regular maintenance of the operating mechanism is necessary for it to operate properly. Proper operation of such a device depends to a large extent on greasing: under-greasing can lead to wear and to the device binding, which slows down the circuit-breaker closure operation, while over-greasing reduces the torque that can be transmitted through the device, which prevents the motor from tensioning the closure spring fully. In addition, the high pressure to which the balls and their tracks are subjected makes it essential to use components that are of high quality and that are precision manufactured, which leads to a manufacturing cost that is high. Those elements are very sensitive to overloading, even overloading for a short time.

SUMMARY OF THE INVENTION

An object of the invention is to improve existing operating mechanisms by providing a freewheel-type coupling device requiring no maintenance between the motor and the trigger shaft.

To this end, the invention provides an operating mechanism for a high-voltage circuit-breaker comprising a coupling device (A) of the freewheel type disposed between a trigger shaft (AC) of the operating mechanism and an electrical motor (M), the coupling device comprising a first friction member (5) linked in motion with the trigger shaft and a second friction member (6) linked in motion with the electrical motor, said friction members being coaxially mounted on a secondary shaft (1) so that when said secondary shaft rotates in a predetermined direction (D) when a spring-loaded mechanism that acts on the device relaxes, it is possible for the second friction member (6) to freewheel about said secondary shaft (1) in said predetermined direction (D) at a speed of rotation that is lower than the speed of rotation of the secondary shaft (1), it also being possible for said second friction member (6) to be rotated by the motor in said predetermined direction, and to become constrained to rotate with the first friction member (5) so as to recock said spring-loaded mechanism, wherein: said first friction member (5) has an outer surface (5') of conical shape and comprises a central bore screwed onto said secondary shaft (1), the second friction member (6) comprises a peripheral set of teeth (12) meshing with the motor drive shaft and a central bore with an inner conical surface (6') which substantially surrounds the outer conical surface (5') of said first friction member, said first and second friction members being designed so that said first friction member is suitable for being moved over a short axial stroke along the secondary shaft either by being screwed when it becomes constrained to rotate with the second friction member (6) or by being unscrewed when said member freewheels about said secondary shaft (1), said first and second friction members (5, 6) remain continuously substantially in abutment one against the other along said secondary shaft (1), said first friction member (5) is suitable for acting when it is screwed to exert a pressure on said second friction member (6), and said second friction member (6) is suitable for acting under the effect of said pressure to press against an axial abutment (8) on the secondary shaft (1) so as to stop said first friction member (5) moving by being screwed, and so as to rotate said secondary shaft by constraining it to rotate with said first friction member (5).

BRIEF DESCRIPTION OF THE DRAWINGS

The invention is described in more detail below and with reference to the accompanying drawing which shows an embodiment of the invention by way of non-limiting example.

The FIG. 1 is a view in section of an embodiment of the coupling device of the freewheel type of the invention.

Figure 2:
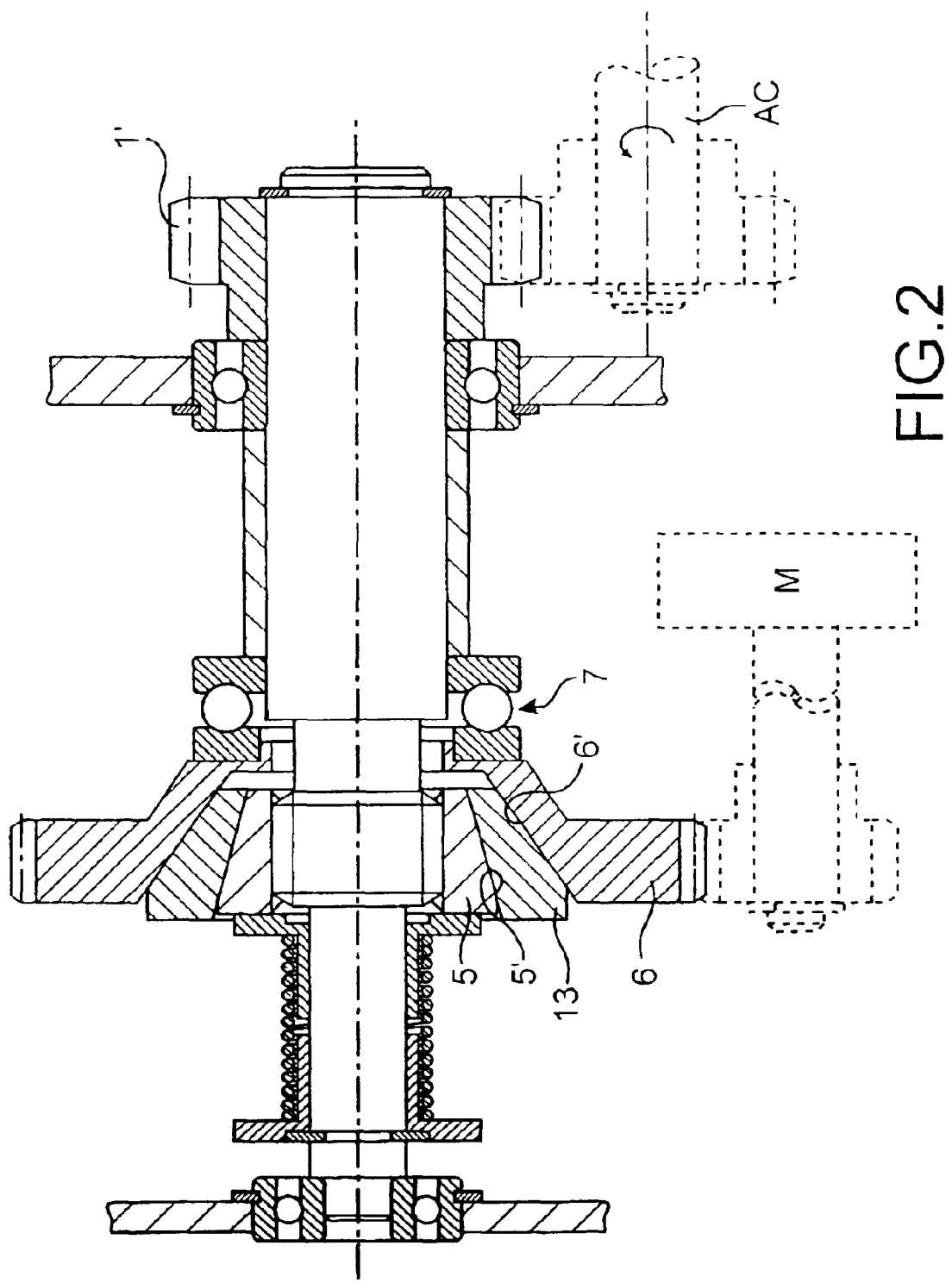

The FIG. 2 is a view in section of an other embodiment of the coupling device of the freewheel type of the invention.

DETAILED DESCRIPTION OF THE INVENTION

Figure 1:
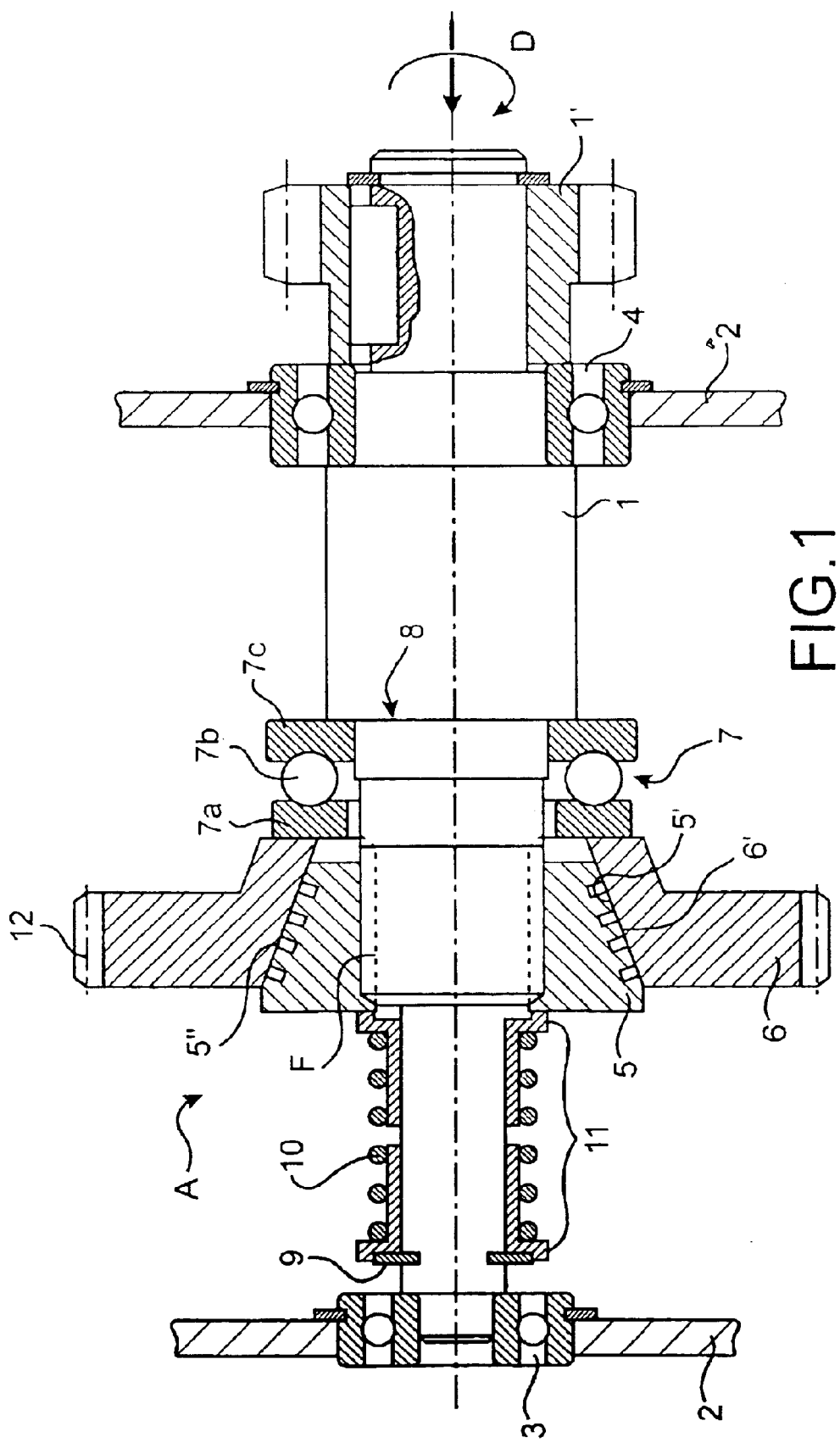

In the example shown in FIG. 1, a coupling device A of the freewheel type comprises a secondary shaft 1 mounted to rotate on a spring-loaded operating mechanism frame 2 by means of two ball bearings 3 and 4. One of the ends of the shaft 1 is provided with a cog 1' which is constrained to move with an operating mechanism trigger shaft (not shown) which serves as a primary shaft. First and second friction members 5 and 6 are mounted on the shaft 1 so as in surround it coaxially while being in abutment one against the other along said secondary shaft 1. The second friction member 6 is constrained to move with a motor (not shown) for the purpose of recocking the operating mechanism by causing its trigger shaft to turn via the coupling device A. More particularly, the first friction member 5 is screwed onto a thread F formed on the shaft 1, and the second friction member 6 is mounted between the first friction member 5 and an axial abutment 7 on the shaft while being free to turn relative to the shaft. In the example in FIG. 1, the two friction members 5 and 6 are substantially in abutment one against the other at contact surfaces 5' and 6' which, in this example have complementary conical shapes. The axial abutment comprises a ball-bearing abutment 7 which surrounds the shaft 1 while being in abutment against a shoulder 8 provided on said shaft. The ball-bearing abutment 7 serves to reduce the friction between the second friction member 6 and the shaft 1 to reduce the resistive torque of the device when it is in a decoupled state (or "freewheel" state). As is known from the state of the art, such an abutment comprises two rings 7a, 7c having substantially identical diameters, surrounding the shaft 1, and spaced apart along it by being separated by balls 7b. For example, one of the rings 7c may be interference fitted on the shaft, and the other ring 7a is free to turn about the shaft, even if a large axial force is applied to it. In the example shown in the figure, the ball-bearing abutment 7 shown could also be a ring interference fitted on the shaft and made of a material having a low coefficient of friction so that the second friction member 6 is free to rotate about the shaft in spite of the contact axial pressure that it exerts on the ring.

In the invention, associating these two friction members 5 and 6 with the shaft 1 forms a coupling device of the freewheel types: the first friction member moves along the shaft 1 over a short stroke by being screwed or unscrewed along the shaft depending on whether it is respectively rotated by the second friction member to be coupled to the shaft, or decoupled from the shaft when said second friction member has resistive torque relative to the shaft.

Starting from a decoupled state of the device, when the second friction member 6 is rotated in the predetermined direction indicated by D in FIG. 1, it rotates the first friction member 5 by friction. The first friction member 5 is then screwed along the shaft so as to exert axial pressure on the second friction member 6 which is in abutment against the axial abutment. The second friction member 6 then prevents the first friction member 5 from moving, thereby increasing the contact pressure and thus the friction between the two members so that said members become, at a certain time, constrained to rotate with each other. In this situation, the second friction member then rotates the shaft 1 via the first friction member, which corresponds to the device being in a coupled state.

When the device is in a coupled state, the second friction member 6 exerts drive torque on the shaft 1 by being rotated by a drive member (not shown), and the shaft is thus rotated by the second friction member in the predetermined direction D. Starting from this state, if the second friction member 6 ceases to exert drive torque, and exerts resistive torque resisting rotation of the shaft, said second friction member tends, by friction, to unscrew the first friction member 5 along the shaft. This moves the second friction member away from the first friction member to some extend axially, thereby reducing the contact pressure between the two friction members, so that they are no longer constrained to rotate together. This corresponds to the device being in a decoupled state in which the second friction member freewheels about the shaft 1.

More particularly, the device is organized so that the stroke of the first friction member 5 along the shaft 1 is as short as possible so that it remains continuously substantially in abutment against the second friction member 6. Thus, the coupling and decoupling states are facilitated by the continuous presence of a small minimum amount of friction torque between the two members. When in the decoupled state, the device leaves the second friction member free to turn about said shaft in said predetermined direction D at a rotation speed lower than the rotation speed of the shaft.

Unlike existing freewheel mechanisms, such as ball-bearing free wheels, greasing is unnecessary because the coupling functions are performed by friction members that are expected to have a high coefficient of friction. Advantageously, the first and second friction members 5, 6 have contact surfaces 5' and 6' made of materials suitable for having coefficients of friction that are sufficiently high. As is known from the state of the art, the pair of materials chosen may, for example, be the steel-on-steel pair or the steel-on-plastic pair.

For example, the contact surfaces 5' and 6' of the two friction members may be chosen to form disks that extend perpendicularly to the shaft, as in a clutch, or they may have other shapes. In the example shown in FIG. 1, the friction surfaces 5' and 6' have complementary conical surfaces, which makes it possible to adjust the value of the slope of the cone as a function of the coefficient of friction of the two friction surfaces 5' and 6'. More particularly, for any given coefficient of friction, a steeper cone facilitates high torque being transmitted by the device of the invention.

As shown in FIG. 1, the first friction member 5 has a convexly conical overall shape, with a threaded central bore that is screwed onto the thread F on the shaft. The second friction member 6 is provided with a central conical bore which forms the contact surface 6'. An additional advantage procured by complementary conical contact surfaces 5' and 6' is that an assembly configuration is implemented in which the second friction member substantially surrounds the first friction member. Thus, the second friction member is centered on the shaft via the first friction member, so that it is not necessary to provide a ball bearing or a centering device, thereby significantly reducing the cost of the operating mechanism of the invention. More particularly, when the device A is coupled, the second friction member 6 is compressed between the conical surface 5' of the first friction member and the axial abutment 7, which centers it accurately relative to the shaft 1. When the device is decoupled, the first friction member 5 is spaced apart to some extent from the axial abutment 7 so that the second friction member 6 is held between the cone 5' and the axial abutment 7, with a small amount of axial operating clearance. In this situation, the second friction member 6 is free to rotate by sliding on the conical surface 5' by means of said small amount of axial operating clearance. The peripheral surface of the first friction member may advantageously be provided with peripheral grooves 5" serving to absorb any dust generated by the contact surfaces 5' and 6' of the two friction members 5 and 6 rubbing together.

In the invention, the first friction member 5, which is screwed onto the shaft 1 has its axial stroke limited by another axial abutment 9 on the shaft 1 so as to reduce its stroke along the shaft when the device is decoupled. Advantageously, a helical spring 10 is mounted between said other abutment 9 and the first friction member 5 so as to hold the first and second friction members 5 and 6 always substantially in abutment one against the other even when the device is decoupled. The axial operating clearance of the second friction member is thus reduced to as small as possible, so that the device is capable of re-coupling rapidly, which improves its operating reliability. More particularly, in the example shown in FIG. 1, the other axial abutment 9 is made up of a spring clip mounted around a peripheral groove in the shaft 1, and the spring 10 is mounted on two bushings 11 which surround the shaft 1 while being disposed between the spring clip and the first friction member 5.

In order to improve the operating reliability still further, the thread F is formed with a pitch of large magnitude. Advantageously, the pitch of the thread F is large enough to form a reversible helical coupling so that the spring continuously presses the first friction member substantially into abutment against the second friction member. The value of the pitch may be chosen to be close to the value of the diameter of the shaft 1 at the thread, optionally with a plurality of starts. More particularly, tests have shown that, with a four-start thread F with a pitch of 20 mm per turn, the device is coupled under optimum conditions.

In the example shown in FIG. 1, the second friction member 6 is provided with a peripheral set of teeth 12 with which a drive shaft cog (not shown) is meshed, so that said second friction member 6 is constrained to move with the motor directly. In this example, the coupling device A is constrained to move with the trigger shaft (not shown) via the cog 1' mounted at the end of the shaft 1. The first friction member 5 may also be provided with a peripheral set of teeth constrained to move with the trigger shaft (not shown in this example) so as to act directly as the cog 1' in the example shown in the FIG. 1.

In the embodiment of FIG. 2, the coupling device of the freewheel type comprises a conical ring 13 disposed between conical contact surfaces 5', 6' of the two friction members 5 and 6. This conical ring 13 is made with a material, as a polyamide reinforced with glass fiber, having good characteristics for absorbing mechanical shocks happening in the coupling device between the motor shaft represented in that figure by a block M and the trigger shaft indicated by AC. This conical ring 13 contributes thus to reduce the operating noise of the coupling device with respect to the operating device shown in FIG. 1 where the complementary conical surfaces 5', 6' of the two friction members are directly in contact one with the other. As shown in FIG. 2, the inner surface of the conical ring 13 which is in contact with the friction conical surface 5' (having or not having peripheral grooves 5") of the friction member 5 and the outer surface of the conical ring 13 which is in contact with the friction conical surface 6' of the friction member 6 are tilted so as the conical ring 13 is hold in place between the two conical surfaces 5', 6' by the action of axially forces exerted by the friction elements 5 and 6.

What is claimed is:

1. An operating mechanism for a high-voltage circuit-breaker comprising a coupling device of the freewheel type disposed between a trigger shaft of the operating mechanism and an electrical motor, the coupling device comprising a first friction member linked in motion with the trigger shaft and a second friction member linked in motion with the electrical motor, said friction members being coaxially mounted on a secondary shaft so that when said secondary shaft rotates in a predetermined direction when a spring-loaded mechanism that acts on the device relaxes, it is possible for the second friction member to freewheel about said secondary shaft in said predetermined direction at a speed of rotation that is lower than the speed of rotation of the secondary shaft, it also being possible for said second friction member to be rotated by the motor in said predetermined direction, and to become constrained to rotate with the first friction member so as to recock said spring-loaded mechanism, wherein:

said first friction member has an outer surface of conical shape and comprises a central bore screwed onto said secondary shaft, the second friction member comprises a peripheral set of teeth meshing with the motor drive shaft and a central bore with an inner conical surface which substantially surrounds the outer conical surface of said first friction member, said first and second friction members being designed so that said first friction member is suitable for being moved over a short axial stroke along the secondary shaft either by being screwed when it becomes constrained to rotate with the second friction member or by being unscrewed when said member freewheels about said secondary shaft, said first and second friction members remain continuously substantially in abutment one against the other along said secondary shaft, said first friction member is suitable for acting when it is screwed to exert a pressure on said second friction member, and said second friction member is suitable for acting under the effect of said pressure to press against an axial abutment on the secondary shaft so as to stop said first friction member moving by being screwed, and so as to rotate said secondary shaft by constraining it to rotate with said first friction member.

2. An operating mechanism according to claim 1, in which said first friction member is held substantially in abutment against said second friction member by a spring.

3. An operating mechanism according to claim 2, in which said first friction member is screwed onto a thread formed on the shaft, said thread being reversible.

4. An operating mechanism according to claim 1, in which said axial abutment is a ball-bearing abutment.

5. An operating mechanism according to claim 1, in which said first friction member is provided with a peripheral set of teeth meshed with said trigger shaft.

6. An operating mechanism according to claim 1, in which a conical ring is disposed between the two conical surfaces of said friction members.

7. An operating mechanism according to claim 1, in which the first friction member has an outer conical surface which is provided with peripheral grooves serving to absorb dust.

8. An operating mechanism according to claim 6, in which the conical ring is made with polyamide reinforced with glass fiber.

9. An operating mechanism according to claim 3, in which the thread has four starts with a pitch of about 20 mm per turn, and the secondary shaft has a diameter of about 24 mm.

* * * * *